United States Patent [19]

Van Camp

[11] Patent Number: 4,749,134

[45] Date of Patent: Jun. 7, 1988

[54] BREWING FUNNEL SUPPORT FOR A COFFEE GRINDER

[75] Inventor: Raymond E. Van Camp, Rochester, Ill.

[73] Assignee: Bunn-O-Matic Corporation, Springfield, Ill.

[21] Appl. No.: 694,510

[22] Filed: Jan. 24, 1985

[51] Int. Cl.$^4$ ............................................. B02C 19/00
[52] U.S. Cl. .................................... 241/100; 241/249; 248/312.1
[58] Field of Search ................ 99/304, 306; 241/100, 241/259; 248/312.1, 313; D7/373

[56] References Cited

U.S. PATENT DOCUMENTS

| | | | |
|---|---|---|---|
| D. 108,965 | 3/1938 | Schuhmann | D7/373 |
| 2,318,797 | 5/1943 | Piper | 241/100 X |
| 3,374,897 | 3/1968 | Martin | 99/304 X |
| 3,502,277 | 3/1970 | Baier et al. | 241/259 |
| 3,603,550 | 9/1971 | Byrd | 248/313 |
| 4,204,516 | 5/1980 | Figura | 241/312.1 X |

Primary Examiner—Timothy V. Eley
Attorney, Agent, or Firm—Lockwood, Alex, FitzGibbon & Cummings

[57] ABSTRACT

A coffee grinder for discharging ground coffee into a brewing funnel which will be removed and inserted into a coffee making machine. The coffee grinder has a ground coffee discharge opening in the underside of an overhanging portion of the grinder. A pair of spring clips of a particular configuration are mounted on the grinder so as to support a brewing funnel immediately beneath the ground coffee opening.

6 Claims, 2 Drawing Sheets

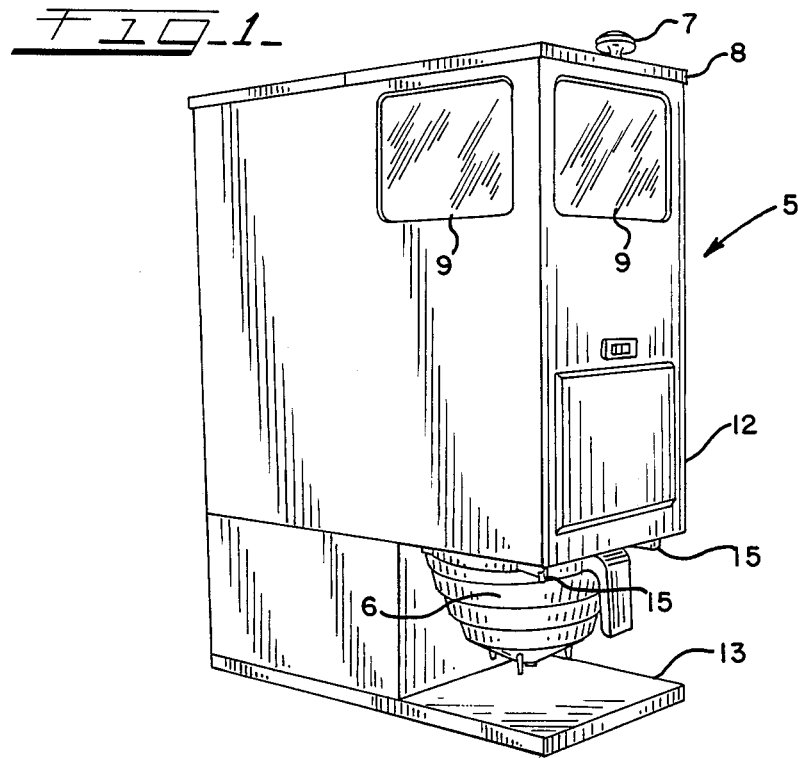
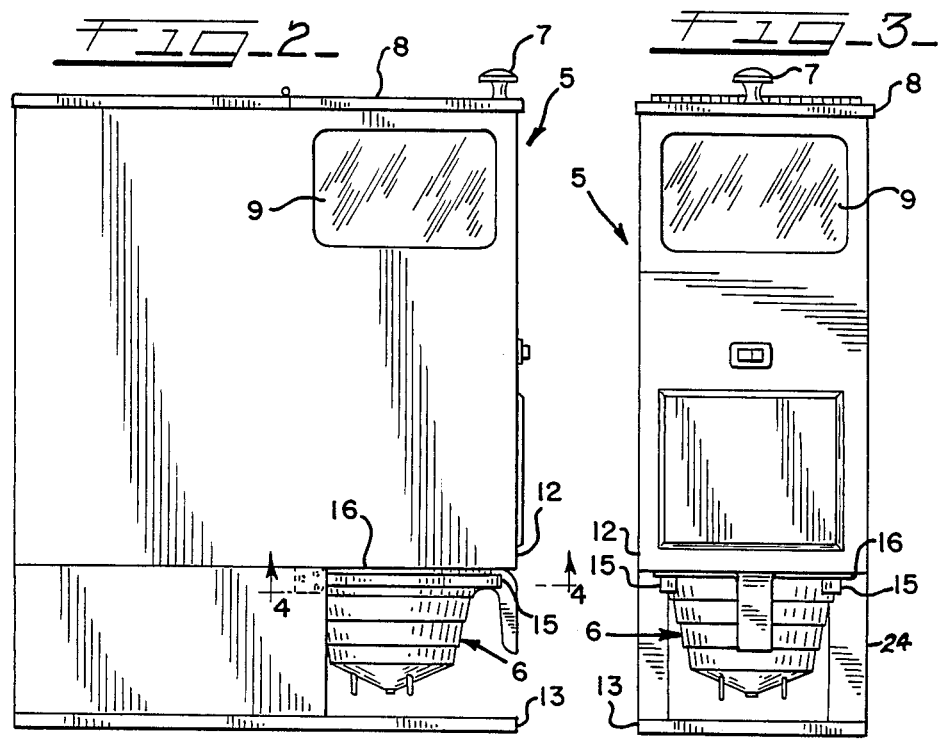

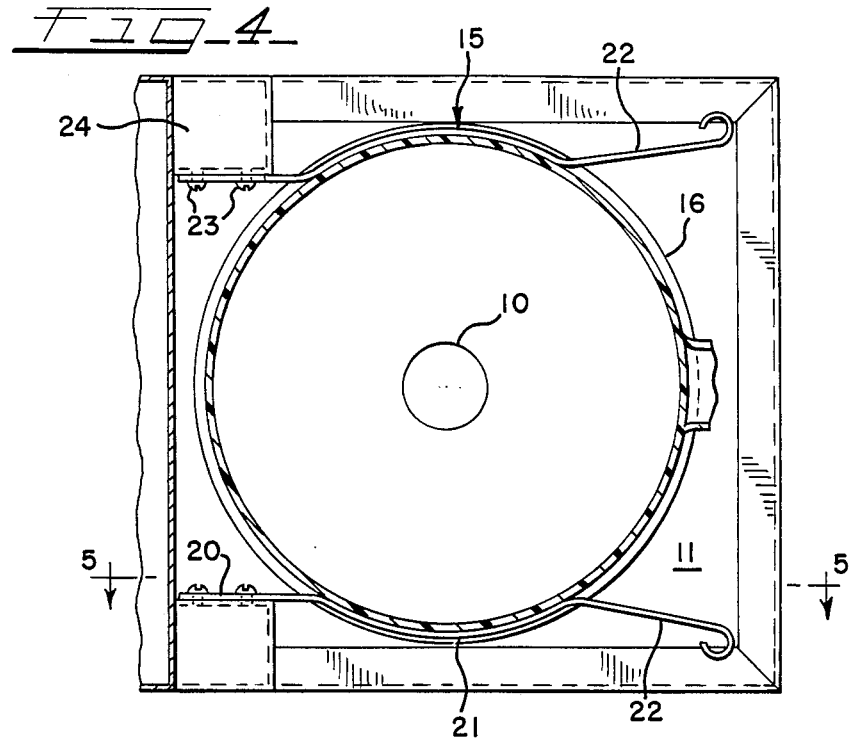
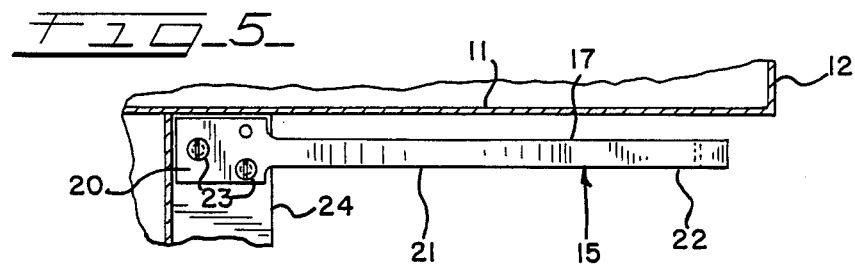
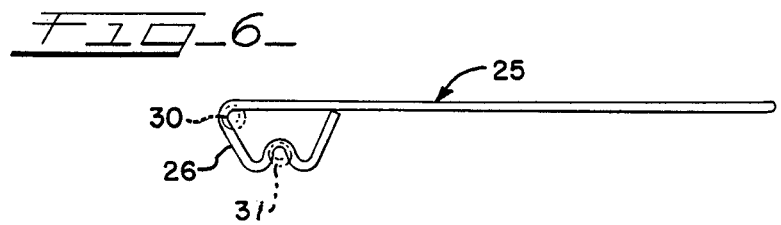
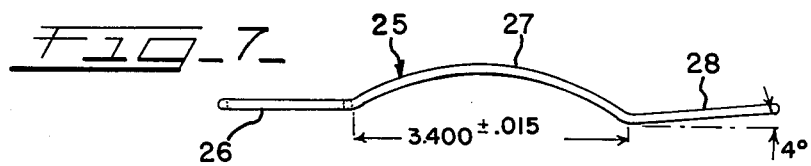

BREWING FUNNEL SUPPORT FOR A COFFEE GRINDER

This invention relates generally to means for releasably supporting a brewing funnel of a coffee making machine on a coffee grinder in such position thereon as to have ground coffee for brewing a batch of coffee discharged into the brewing funnel. Coffee making machines of the type wherein a disposable filter is inserted into a brewing funnel, ground coffee is loaded into the brewing funnel on the filter, and the brewing funnel is inserted into the coffee making machine wherein hot water is sprayed over the coffee in the funnel and the brewed coffee is collected in a container under the funnel, are well known and in wide spread use. In recent years, the practice of making coffee with freshly ground coffee beans has become popular and coffee grinders are available which are adapted to grind coffee beans into batches of ground coffee of the sizes suitable for the brewing funnels of coffee machines used in restaurants, offices, homes, etc.

Instead of collecting a batch of ground coffee in a separate container and then transferring it from that container into a filter-lined brewing funnel, it is desirable for convenience and other reasons to collect the batch of ground coffee directly into the brewing funnel onto the filter placed therein. As a practical matter because of the various sizes and shapes of the brewing funnels that are in use and the variations in the configurations and the thicknesses of the supporting flanges customarily located at the rims of the funnels, there has been a problem in releasably supporting the brewing funnels in a coffee grinder so as to receive a ground batch of coffee therein.

The object of the present invention, generally stated, is the provision of brewing funnel support means for a coffee grinder which will permit brewing funnels of somewhat different sizes, dimensions, shapes and with rim supporting flanges of somewhat different thickness and shapes to be mounted on a coffee grinder so as to releasably support such brewing funnels under a ground coffee discharge opening.

An important object of the invention is the provision of brewing funnel support means for a coffee grinder comprising a pair of spaced-apart spring clip members having proximal ends rigidly mounted on the coffee grinder below an overhanging portion thereof which has a ground coffee discharge opening in the underside with the spring clips adapted to have supporting engagement on opposite sides of the brewing funnel underneath the lateral flange provided on the rim thereof.

A further important object of the invention is the provision of brewing funnel support means for a coffee grinder which support means are in the form of a pair of spring clips suitably mounted on a coffee grinder and which have such a configuration as to provide good and adequate brewing funnel support engagement with brewing funnels that vary somewhat in size, shape and configuration and which have supporting flanges at their rims which vary in the thickness and configuration.

Certain other objects of the invention will appear hereinafter in connection with the following detailed description of preferred embodiments of the invention taken in connection with the accompanying drawings wherein:

FIG. 1 is a perspective view of a coffee grinder with a brewing funnel supported in place thereon by support means forming one embodiment of the present invention.

FIG. 2 is a left side elevational view of the coffee grinder shown in FIG. 1.

FIG. 3 is a front elevational view of the coffee grinder and funnel shown in FIG. 1.

FIG. 4 is a detailed view on an enlarged scale which is partly in section and taken on line 4—4 of FIG. 2.

FIG. 5 is a fragmentary detailed sectional view taken on line 5—5 of FIG. 4 but in inverted relationship.

FIG. 6 is a side elevational view of a type of spring clip that may be used in place of spring clips shown in FIGS. 1-5.

FIG. 7 is a planned view of the spring clip shown in claim 6.

In FIGS. 1-3 a coffee bean grinder is indicated generally at 5 having inserted in place therein a brewing funnel indicated generally at 6. The coffee grinder 5 may be of known commercial typ and the details of construction thereof do not form part of the present invention. Likewise the brewing funnel 6 may be of known commercial type such as used in known commercial coffee brewers. For example, the brewing funnel 6 may be of the construction of the brewing funnel shown in U.S. Pat. No. 3,374,897 issued Mar. 26, 1968.

The grinder 5 can be loaded with coffee beans from the top by lifting on the handle 7 on the door 8 opening into the bean hopper which is provided with windows 9—9 through which the quantity of beans remaining to be ground may be viewed. The grinder mechanism disposed within the body of the grinder 5 discharges ground coffee through an opening 10 (FIG. 4) in the plate 11 (FIG. 5) forming the underside of the portion 12 of the grinder that overhangs platform 13.

It will be noted from FIGS. 1-3 that the brewing funnel 6 is supported underneath the overhanging portion 12 by a pair of spring clips 15—15. The upper portion of the brewing funnel 6 fits in between the cantilevered spring clips 15 which engage the funnel from opposite sides underneath the flange 16 extending laterally around the rim of the funnel 6.

For a detailed description of the spring clips 15 reference may be had to FIGS. 4 and 5. Each spring clip 15 corresponds to each other spring clip 15 with the only deviations or differences being such as those which occur in mass production. Each spring clip 15 is formed of flat strip stock and has three primary sections, one being the proximal end mounting formation 20, another being the intermediate arcuate funnel engaging section 21 and the third being the outwardly bent distal end portion 22. The proximal end portion 20 of each of the spring clips 15 is generally rectangular and provided with three screw-receiving openings so that by the use of screws 23—23 the spring clip 15 may be rigidly secured or attached to a rigid portion 24 of the grinder body.

As will be noted from FIG. 5 the upper edge 17 of each spring clip 15 is spaced somewhat below the underside surface of the grinder plate 11. The purpose of this spacing is to allow brewing funnels with support flanges of various thicknesses at their rims to be accepted between and supported by the spring clips 15. It has been found that when the intermediate arcuate sections 21 have arcuate configurations with a radius between 3.385–3.415 inches they will have good supporting engagement with the upper side portions and rim flanges on many brewing funnels used in restaurants and other small establishments. Further, it is preferred that the chordal length of the arcuate sections 21 equal the radius of curvature thereof. Preferably, the distal ends 22 diverge outwardly at angles of approximately 4 degrees to facilitate insertion of the funnel 6.

The spring clips 15 may be replaced with a pair of spring clips formed of round spring wire stock, one such clip 25 being shown in FIGS. 6 and 7. Since the proximal end portion 26 of the spring clip 25 is below the arcuate funnel gripping section 27 and distal end 28, sets of right hand and left hand clips 25 are required. The attaching screws for the proximal ends 26 are indicated in broken line at 30 and 31 in FIG. 6. The configuration of the spring clip 25 in plan view corresponds to that of the spring clips 15—15.

It will be seen that certain other changes of an obvious nature may be made without departing from the spirit and scope of the invention as defined in the claims. For example, instead of using screws 23—23 (FIGS. 4 and 5) and screws 30, 31 (FIG. 6), spot welds may be used for securing the proximal ends of the spring clips 15—15 and 25—25 to the grinder. By way of further example, it will be seen that with minor changes the proximal end portions 20 and 26 of clips 15 and 25, respectively, can be mounted to either the underside of plate 11 or to the front sides of the posts 24.

What is claimed is:

1. In combination with a coffee grinder having a downwardly discharging ground coffee outlet in a horizontal underside surface of an overhanging portion of said grinder, means for releasably supporting one at a time brewing funnels which are non-uniform in respect to size and shape each having a rim and support flange at its rim in insertable and removable relationship with respect to said grinder comprising, a pair of spring clips each having a proximal end and a distal end and including a mounting formation at its proximal end attached to said grinder so that said spring clips extend in a cantilever manner and a brewing funnel support relationship beneath said horizontal under surface, the brewing funnel engaging portions of said spring clips being spaced below said horizontal underside surface so as to accommodate between said surface and said clips said flange on the rim of a brewing funnel, said distal ends of said spring clips being bent outwardly with respect to each other so as to facilitate the insertion of a brewing funnel, and wherein each of said spring clips has an intermediate arcuate section which engages an inserted brewing funnel.

2. The combination of claim 1 wherein said horizontal underside surface is provided by a rectangular plate.

3. The combination of claim 1 wherein said spring clips are formed of flat stock and are indentical.

4. The combination of claim 1 wherein said spring clips are formed of round wire and one is a right hand clip and the other is a left hand clip.

5. The combination of claim 1 wherein the chordal length and the radius of curvature of each said intermediate arcuate section are approximate equal.

6. The combination of claim 1 wherein said intermediate arcuate section has a chordal length of approximately 3.4 inches and a radius of curvature of approximately 3.4 inches.

* * * * *